Figure 4:
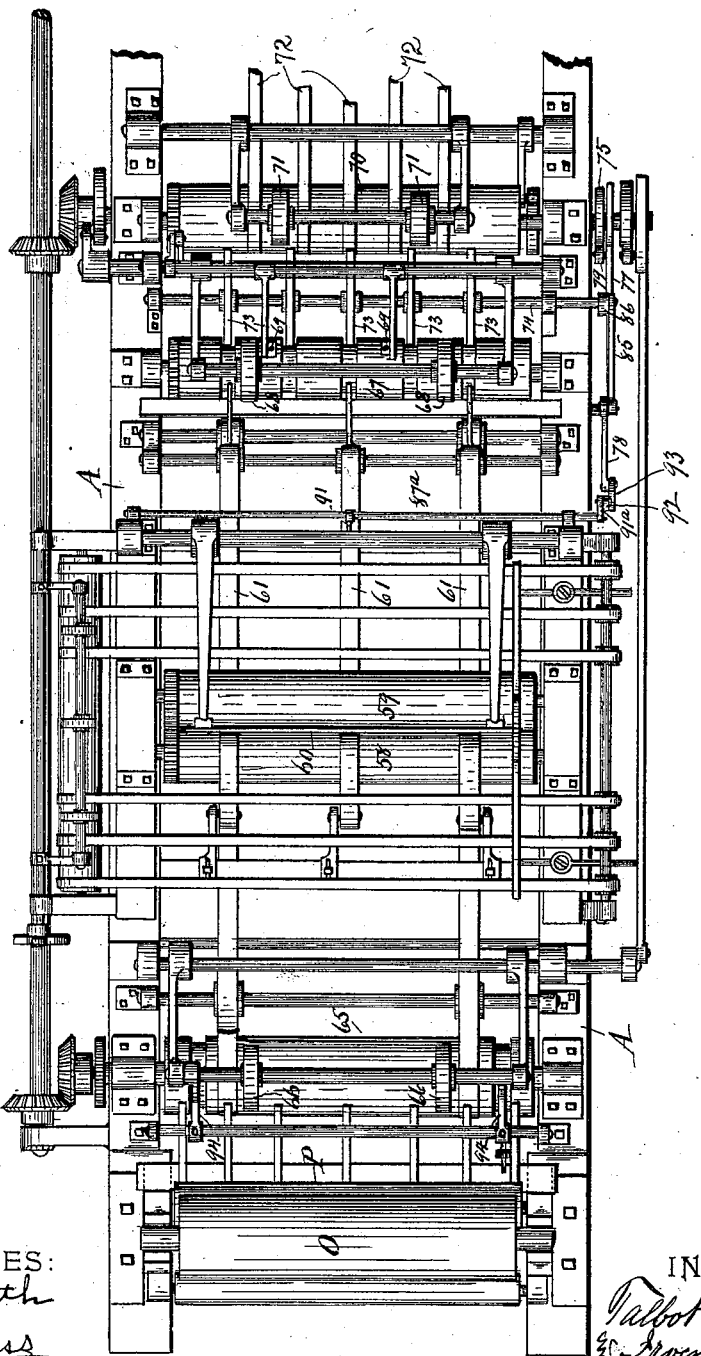

No. 655,963. Patented Aug. 14, 1900.
T. C. & I. H. DEXTER.
MAILING MACHINE.
(Application filed Aug. 2, 1899.)
(No Model.) 13 Sheets—Sheet 1.
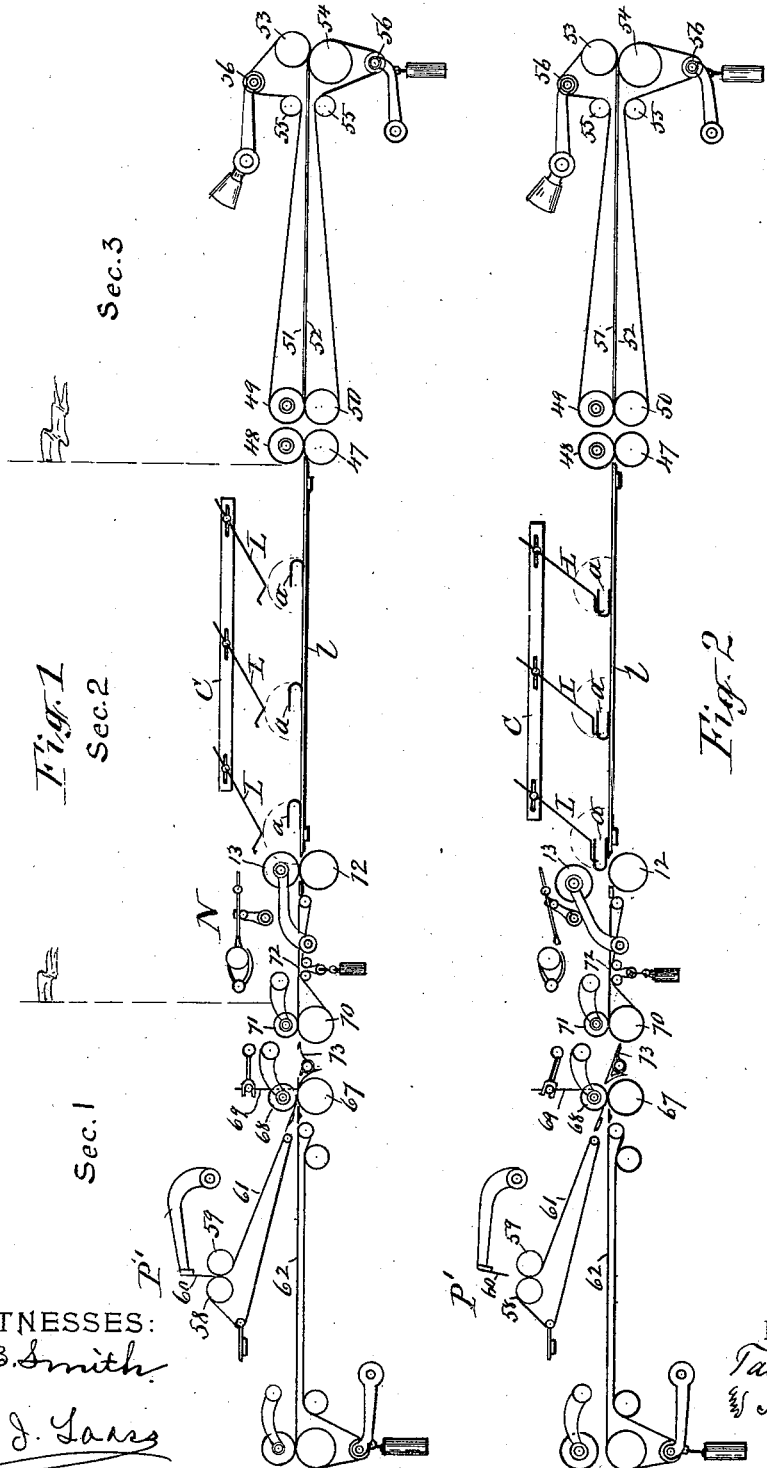
WITNESSES:
H. B. Smith
J. J. Laass
INVENTORS:
Talbot C. Dexter
Irven H. Dexter
By E. Laass
their ATTORNEY

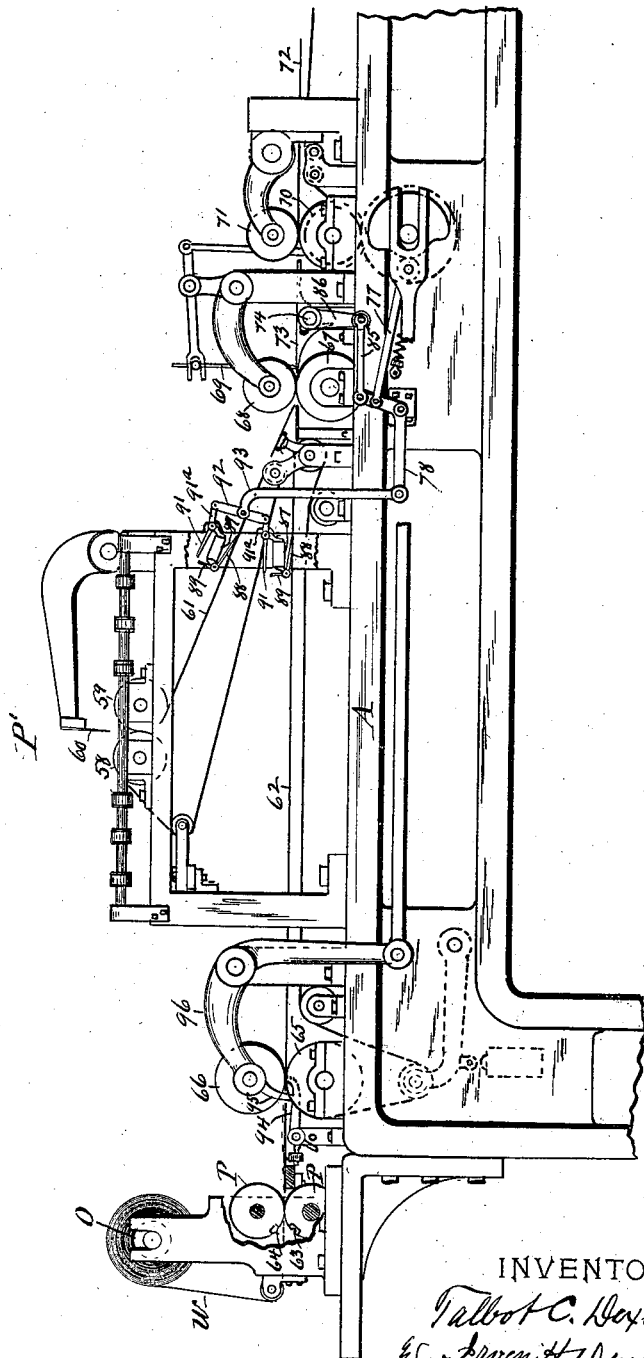

No. 655,963. Patented Aug. 14, 1900.
T. C. & I. H. DEXTER.
MAILING MACHINE.
(Application filed Aug. 2, 1899.)

(No Model.) 3 Sheets—Sheet 3.

WITNESSES:
H. B. Smith
J. J. Laass

INVENTORS:
Talbot C. Dexter
Iroen H. Dexter
By E. Laass
their ATTORNEY

No. 655,963. Patented Aug. 14, 1900.
T. C. & I. H. DEXTER.
MAILING MACHINE.
(Application filed Aug. 2, 1899.)
(No Model.) 13 Sheets—Sheet 4.

WITNESSES:

INVENTORS:
Talbot C. Dexter
Irven H. Dexter
By E. Laass
their ATTORNEY

No. 655,963.

T. C. & I. H. DEXTER.
MAILING MACHINE.
(Application filed Aug. 2, 1899.)

Patented Aug. 14, 1900.

(No Model.)

13 Sheets—Sheet 6.

WITNESSES:

INVENTORS
Talbot C. Dexter
Irven H. Dexter
By E. Laass
their ATTORNEY

No. 655,963. Patented Aug. 14, 1900.
T. C. & I. H. DEXTER.
MAILING MACHINE.
(Application filed Aug. 2, 1899.)
(No Model.) 13 Sheets—Sheet 7.

WITNESSES:

INVENTORS:
Talbot C. Dexter
Irven H. Dexter
By E. Laass
Their ATTORNEY

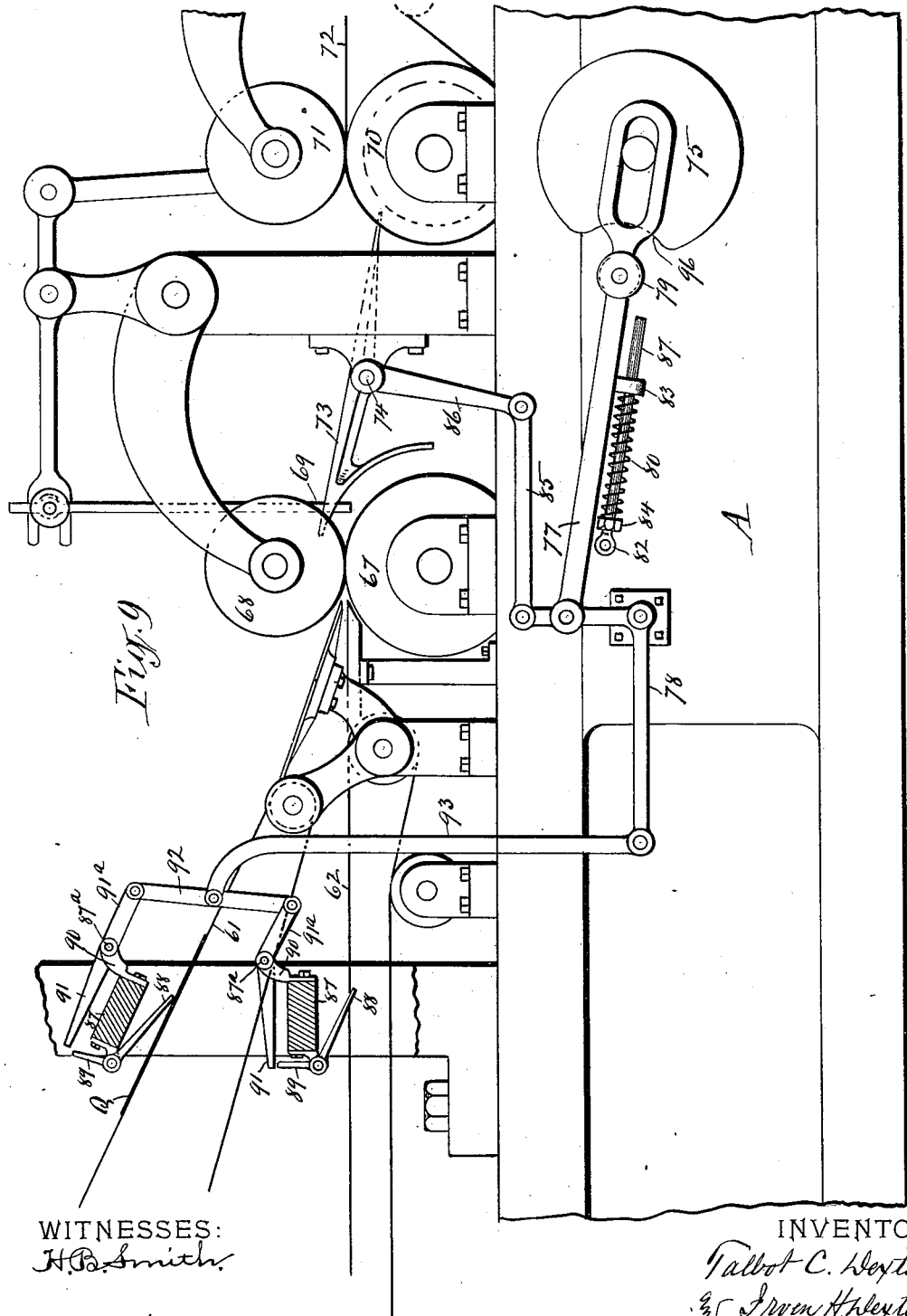

No. 655,963.  
T. C. & I. H. DEXTER.  
MAILING MACHINE.  
(Application filed Aug. 2, 1899.)  
Patented Aug. 14, 1900.
(No Model.)
13 Sheets—Sheet 9.
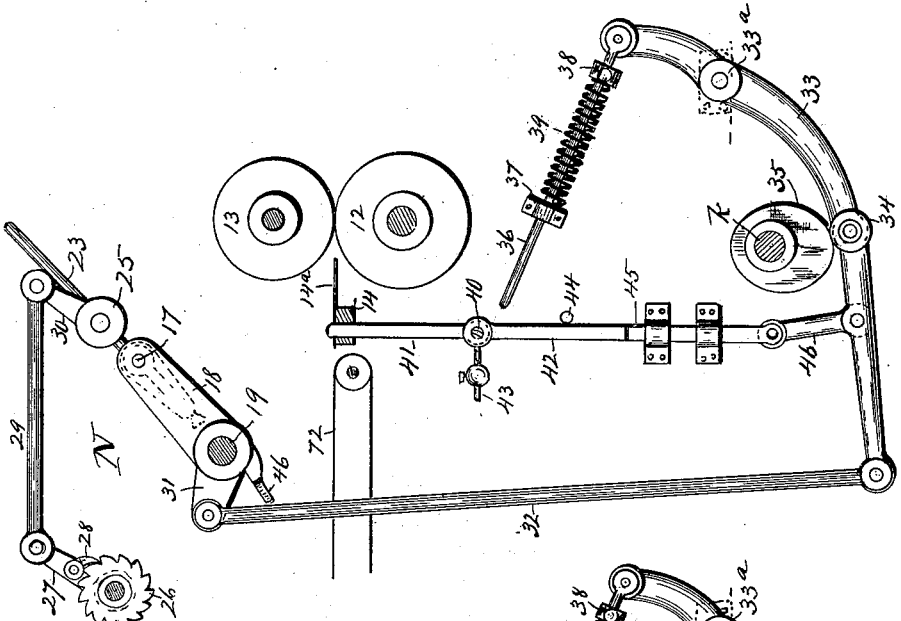
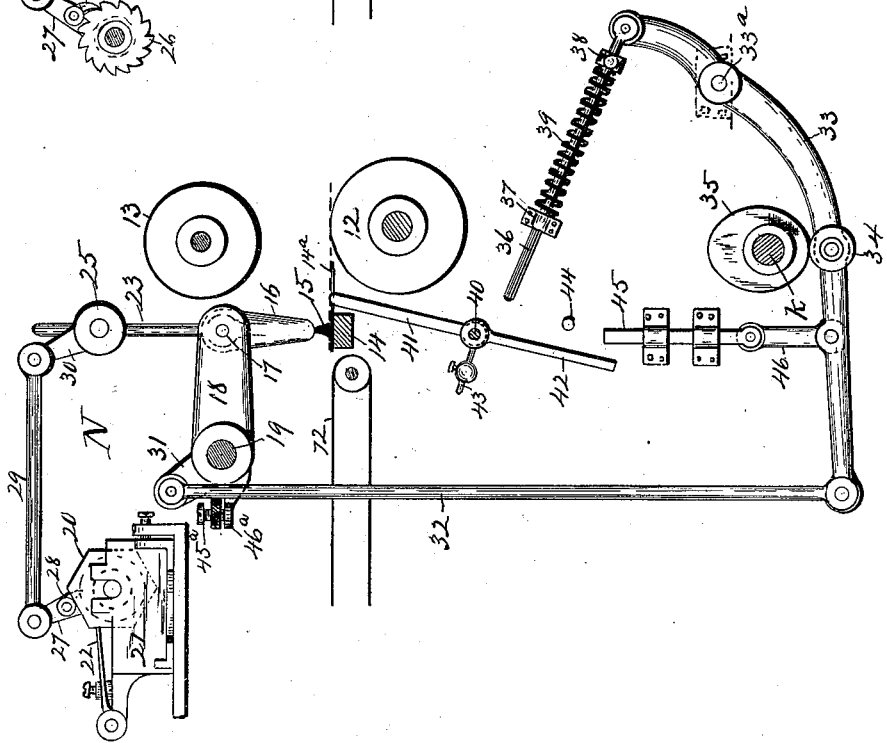
WITNESSES:  
H. B. Smith.  
J. J. Laass
INVENTORS:  
Talbot C. Dexter  
Irwen H. Dexter  
By E. Laass  
their ATTORNEY No. 655,963. Patented Aug. 14, 1900.
T. C. & I. H. DEXTER.
MAILING MACHINE.
(Application filed Aug. 2, 1899.)

(No Model.) 13 Sheets—Sheet 10.

WITNESSES:
H. B. Smith
J. J. Laass

INVENTORS:
Talbot C. Dexter
Irven H. Dexter
By E. Laass
their ATTORNEY

THE NORRIS PETERS CO., PHOTO-LITHO., WASHINGTON, D. C.

No. 655,963. Patented Aug. 14, 1900.
T. C. & I. H. DEXTER.
MAILING MACHINE.
(Application filed Aug. 2, 1899.)
(No Model.) 13 Sheets—Sheet 11.

WITNESSES:
H. B. Smith
J. J. Laass

INVENTORS:
Talbot C. Dexter
Irven H. Dexter
By E. Laass
their ATTORNEY

No. 655,963. Patented Aug. 14, 1900.
T. C. & I. H. DEXTER.
MAILING MACHINE.
(Application filed Aug. 2, 1899.)

(No Model.) 13 Sheets—Sheet 12.

WITNESSES:
H. B. Smith
J. J. Laass

INVENTORS:
Talbot C. Dexter
Irven H. Dexter
Their ATTORNEY

No. 655,963. Patented Aug. 14, 1900.
T. C. & I. H. DEXTER.
MAILING MACHINE.
(Application filed Aug. 2, 1899.)
(No Model.) 13 Sheets—Sheet 13.
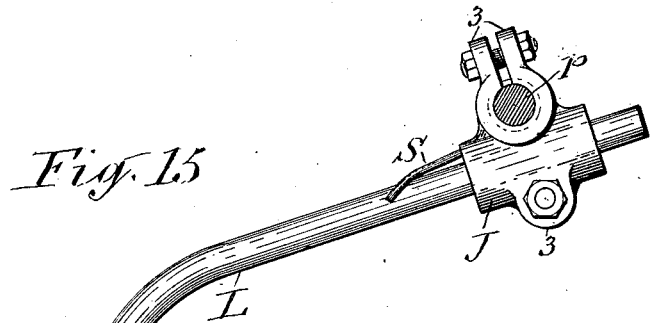
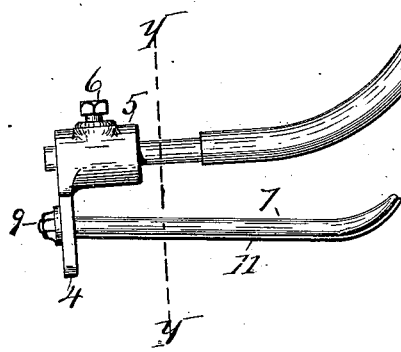
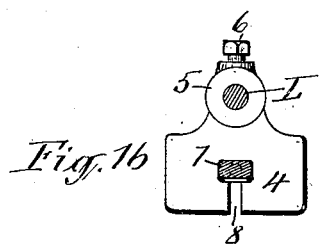
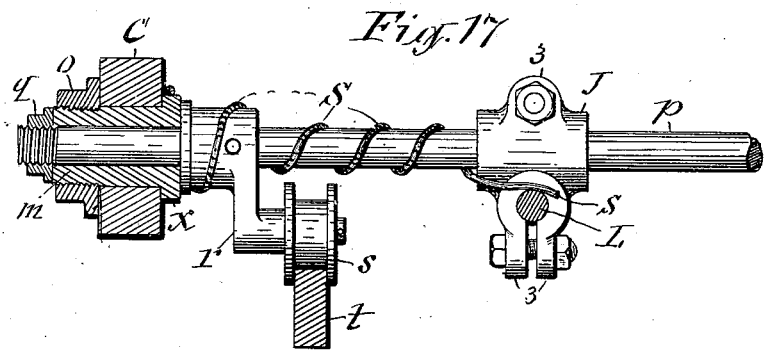
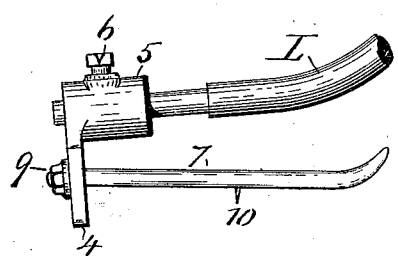
WITNESSES:
H. B. Smith
J. J. Laas
INVENTORS
Talbot C. Dexter
Irven H. Dexter
By E. Laas
their ATTORNEY
THE NORRIS PETERS CO., PHOTO-LITHO., WASHINGTON, D. C.

UNITED STATES PATENT OFFICE.

TALBOT C. DEXTER AND IRVEN H. DEXTER, OF PEARL RIVER, NEW YORK, ASSIGNORS OF THREE-FOURTHS TO SAID TALBOT C. DEXTER AND ONE-FOURTH TO SAID IRVEN H. DEXTER.

MAILING-MACHINE.

SPECIFICATION forming part of Letters Patent No. 655,963, dated August 14, 1900.

Application filed August 2, 1899. Serial No. 725,835. (No model.)

*To all whom it may concern:*

Be it known that we, TALBOT C. DEXTER and IRVEN H. DEXTER, citizens of the United States, and residents of Pearl River, in the county of Rockland, in the State of New York, have invented new and useful Improvements in Mailing-Machines, of which the following, taken in connection with the accompanying drawings, is a full, clear, and exact description.

The purpose of this invention is to expeditiously and reliably fold newspapers, periodicals, and analogous papers and envelop the same in wrappers securely pasted and in proper condition for mailing the articles; and to that end the invention consists in the novel organization of the mailing-machine hereinafter described, and set forth in the claims.

The invention is fully illustrated in the annexed drawings, in which—

Figure 5:
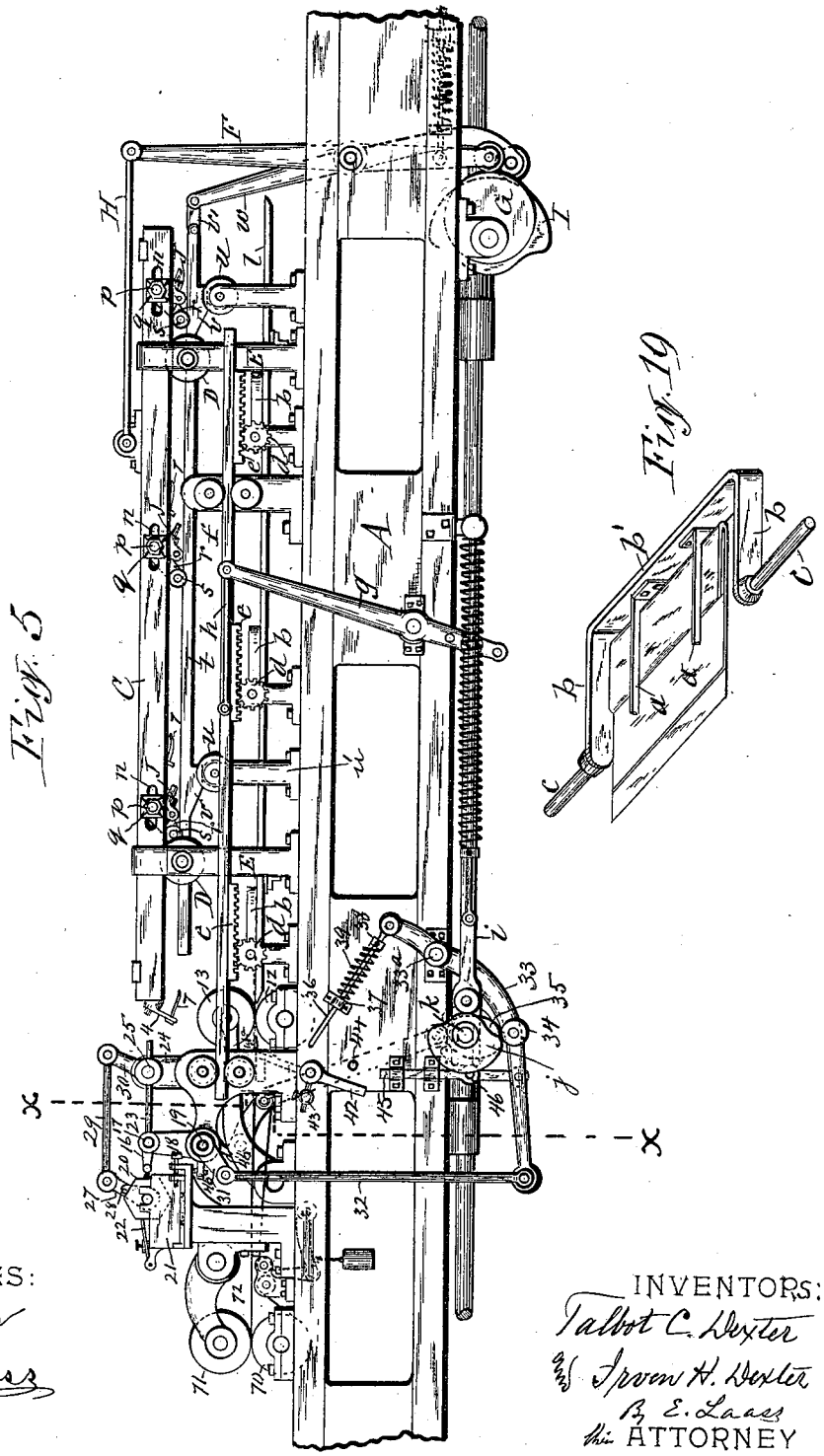
Figure 6:
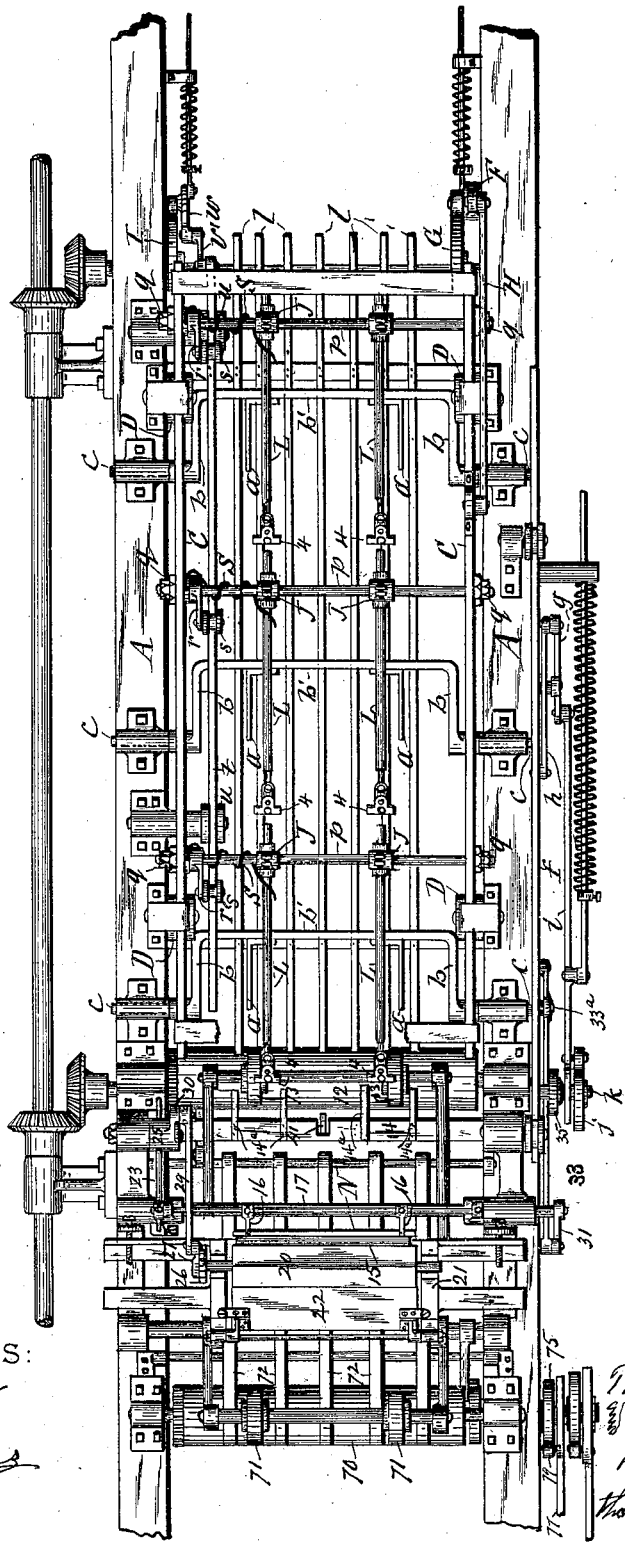
Figure 7:
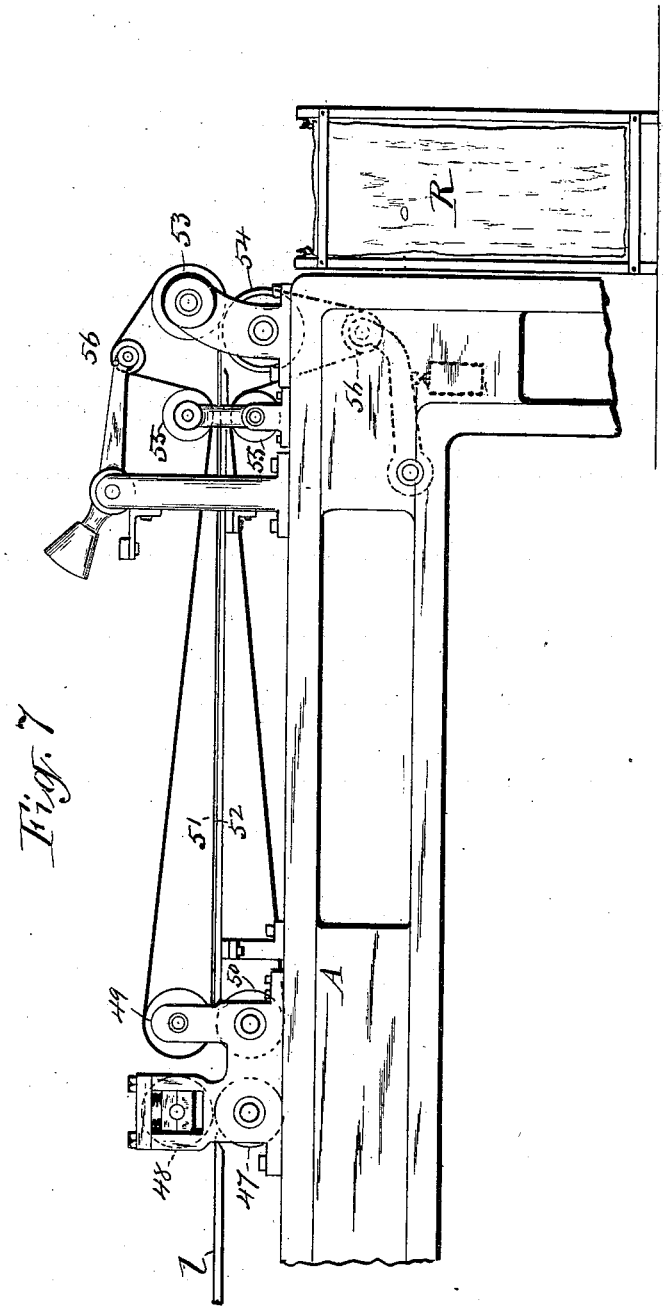
Figure 8:
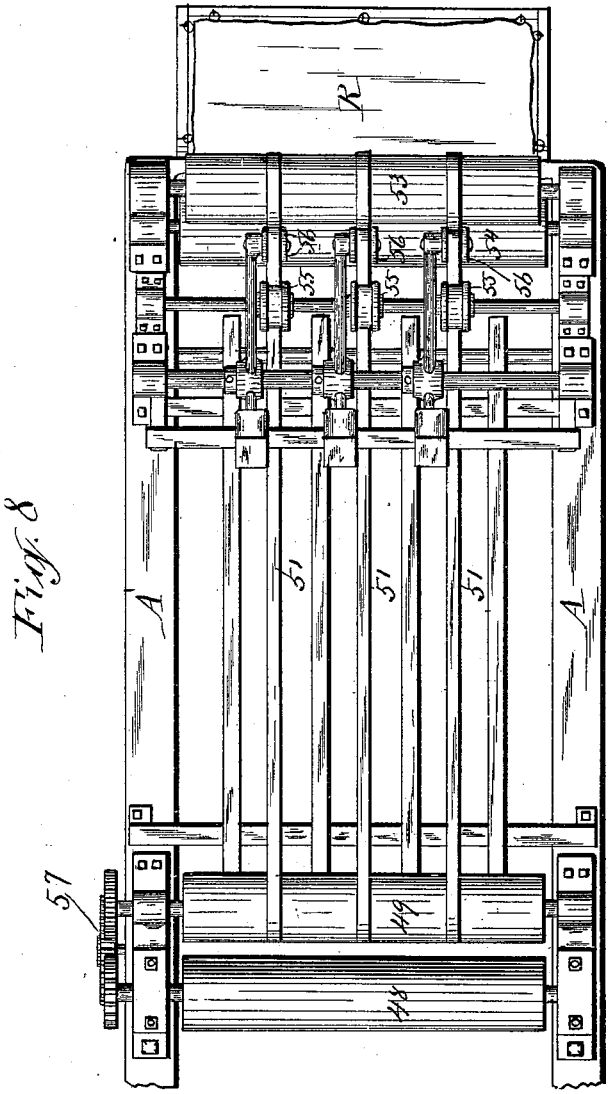
Figure 12:
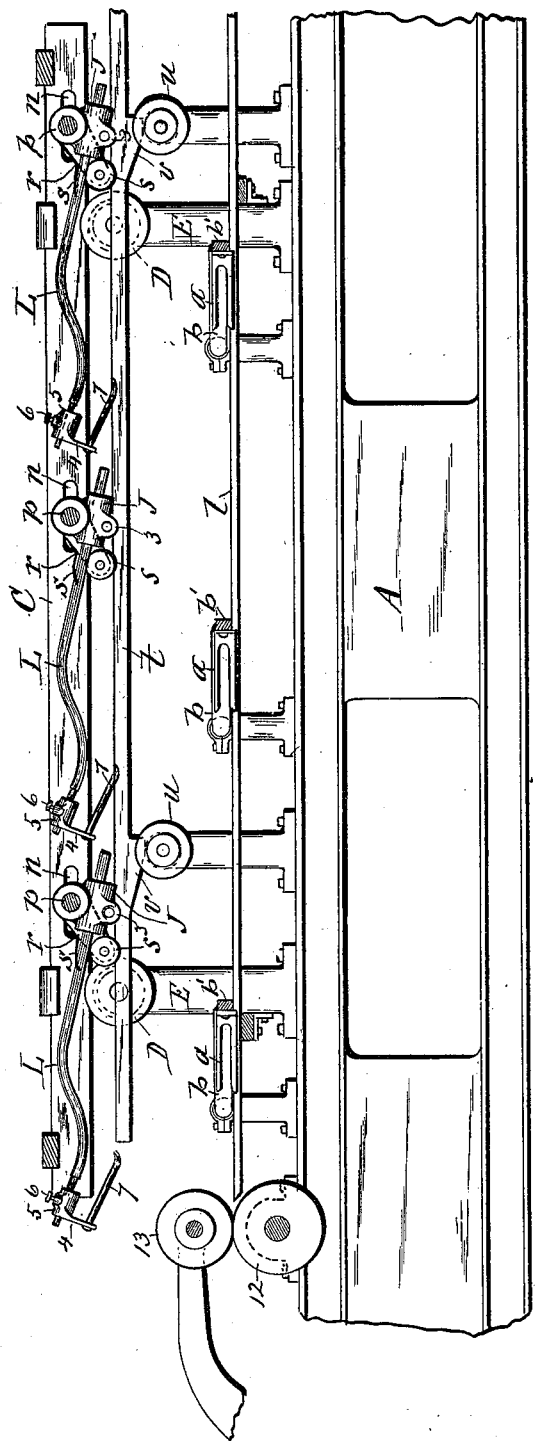
Figure 13:
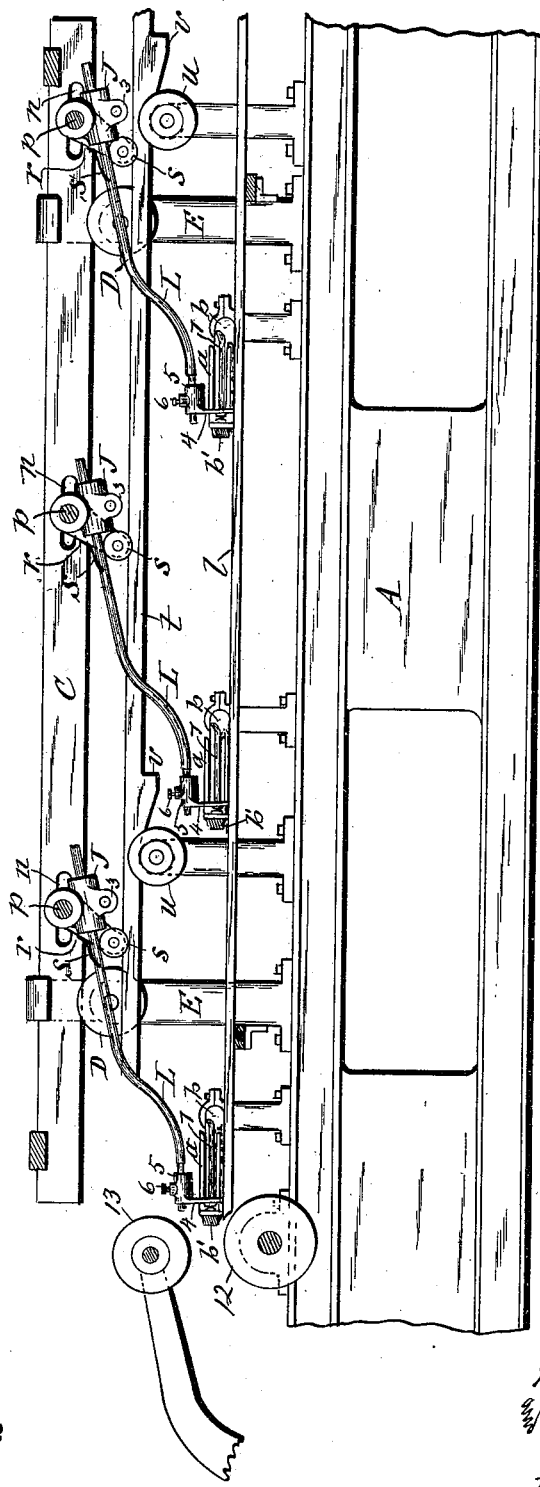
Figure 14:
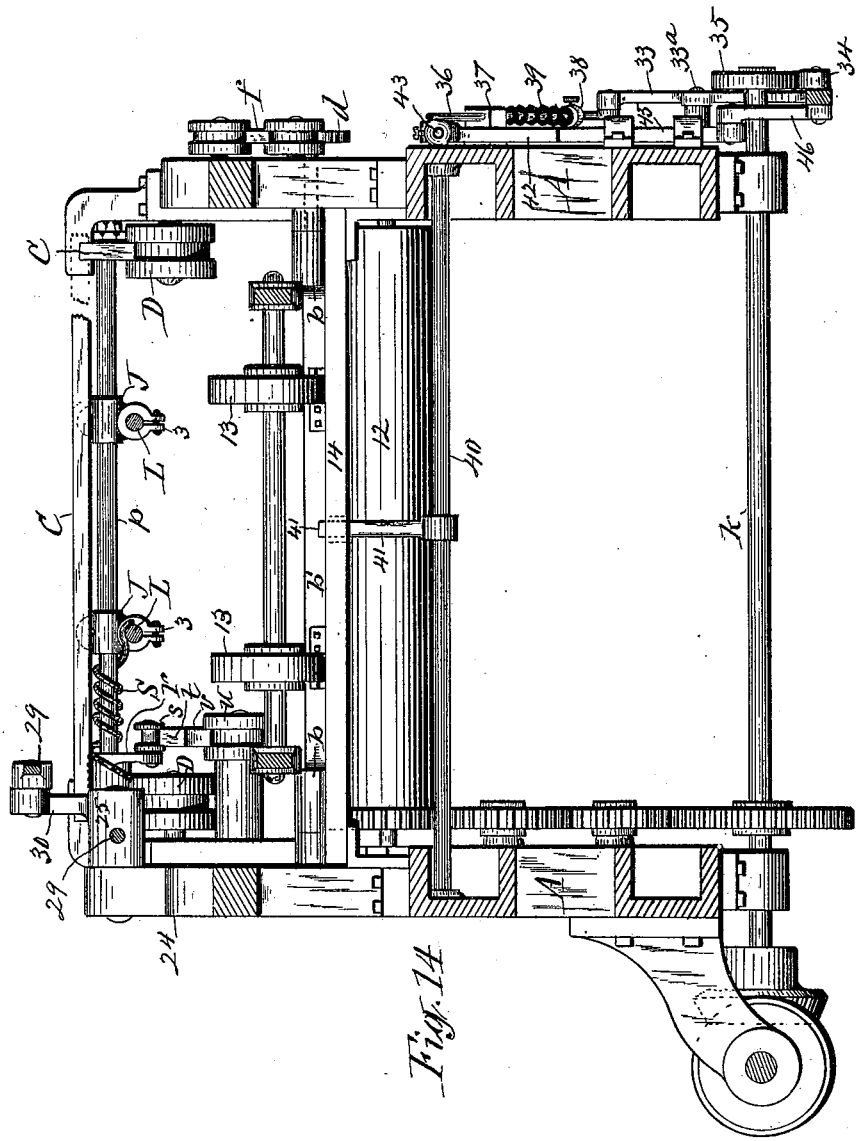

Figures 1 and 2 are diagrammatic longitudinal sectional views of the machine, showing in different operative positions the various devices which are arranged in the path of the paper and wrapper for conveying and operating upon the same. Fig. 3 is an enlarged side elevation of the portion of the machine marked "Sec. 1" in Fig. 1. Fig. 4 is a plan view of said section. Fig. 5 is an enlarged side elevation of the portion marked "Sec. 2." Fig. 6 is a plan view of said section. Fig. 7 is an enlarged side elevation of the section marked "Sec. 3." Fig. 8 is a plan view of Fig. 7. Fig. 9 is a further enlarged side view of the sheet-diverging switch and its controlling mechanism. Figs. 10 and 11 are enlarged diagrammatic views of the pasting instrument shown in different operative positions. Figs. 12 and 13 are enlarged longitudinal sectional views of the devices for folding the paper with its wrapper and showing the same in different operative positions. Fig. 14 is an enlarged vertical transverse section on line X X in Fig. 5 of the drawings. Fig. 15 is an enlarged side view of one of the devices for shifting the sheets into the successive folding-forks. Fig. 16 is a transverse section on line Y Y in Fig. 15. Fig. 17 is a fragmentary sectional and front view of the means for carrying the said sheet-shifting devices. Fig. 18 is a side view of a modification of the means for obtaining a positive hold upon the folded sheets for shifting the same to the successive folding devices, and Fig. 19 is a perspective view of one of the sets of paper-folding forks with the paper and wrapper inserted into the forks.

Similar letters and numerals of reference indicate corresponding parts.

A is a horizontally-prolonged stout frame of suitable shape to support the various mechanisms of the machine. In the central portion of the length of said machine are located the devices for folding the paper with its wrapper. The most serious difficulties are encountered in the operation of the means employed for successively folding the paper in a neat and compact form with the wrapper properly secured thereto, which difficulties are due to the usual bulky condition imparted to the sheets by the successive folding of the same. Our invention effectually overcomes this difficulty, first, by folding the paper upon a straight or horizontal bed while retaining the unfolded portion stationary upon said bed, and thus folding the paper in the manner practiced when folding it by hand, and, secondly, by providing means for sliding the paper along on the bed from fork to fork and at the same time continuously pinching and compressing the entire width of the folded portion, as hereinafter more fully described.

Referring to the drawings, *a a* represent the paper-folding forks, which are preferably arranged parallel in pairs or sets, and a plurality of such sets are arranged in a straight row extending lengthwise over a stationary horizontal bed *l*, composed of longitudinal slats, which serve to support and guide the sheets in transit to the successive forks. Each pair or set of said forks is fastened to a yoke consisting of parallel arms *b b*, united at one end by a transverse bar *b'*, to which the forks *a a* are attached, so as to project at right angles therefrom and lie parallel between the arms *b b*. Each of these yokes is provided on the free ends of its arms *b b* with trunnions *c*, by which the yoke is pivoted to suitable supports mounted upon the frame A at points contiguous to the plane of the paper-supporting bed *l*. To the trunnions at corresponding ends of the yokes are fastened pinions $d$, which mesh with longitudinal racks $e$, riding upon the tops of said pinions and fastened to a longitudinal bar $f$, which receives an intermittingly-reciprocating motion from a lever $g$, pivoted intermediate its ends to the frame A and connected at one end to the bar $f$ by a rod $h$ and connected at its opposite end to a rod $i$, which receives properly-timed reciprocating motion from a cam $j$, fastened to a transverse rotary shaft $k$, as shown in Fig. 5 of the drawings. The reciprocating motion of the rack-carrying bar $f$ imparts oscillatory motion to the fork-carrying yokes and causes the forks to present their free ends alternately toward the front and rear of the machine and at the same time lie in planes parallel and contiguous to the paper-supporting bed $l$.

The yokes are placed proper distances apart to permit the aforesaid oscillatory motion and the shifting of the folded sheets into the successive sets of forks, as hereinafter described.

For shifting the folded sheets into the successive sets of forks as aforesaid we prefer to employ suitable arms supported movable longitudinally over the row of forks and oscillatory to and from the same and suitable means attached to the free ends of said arms for pushing the folded sheets out of one set of forks and into the succeeding set of forks. We do not limit ourselves to any specific construction of said sheet-shifting devices, as it is susceptible of many modifications. The essential features of said shifting devices are their travel lengthwise over the horizontal bed $l$, and in said travel sliding the paper along on said bed from fork to fork and at the same time continuously pressing upon the folded portion of the paper across the entire width thereof. We deem, however, the following construction as very simple and efficient, it consisting of a carriage C, mounted on rollers D D, which are pivoted to standards E, erected on the frame A, which rollers allow said carriage to travel longitudinally over the row of the before-described yokes or sets of paper-folding forks, said carriage receiving an intermittingly-reciprocating motion by means of a lever F, oscillated by a rotary cam G and connected to the carriage by a pitman H. To said carriage are secured journal-boxes $m$, preferably of tubular shape and inserted in longitudinal slots $n$ in the carriage, which slots allow the journal-boxes to be adjusted longitudinally on the carriage. Each of said journal-boxes is provided on one end with an abutting collar $x$ and is screw-threaded externally on its opposite end and provided thereat with a nut $o$. By tightening this nut the journal-box is clamped in its required position on the carriage. In the journal-boxes $m\ m$ on the two sides of the carriage are mounted the ends of transverse shafts $p$, which are permitted to rock and are prevented from moving endwise, preferably, by means of nuts $q^\times$, connected to the protruding screw-threaded ends of the shafts, as shown in Fig. 17 of the drawings. The rocking motion is imparted to said shafts by means of arms $r$, fastened thereto and having pivoted to their free ends rollers $s$, which ride on a longitudinal bar $t$, supported on rollers $u$, which are pivoted to suitable supports $u'$, secured to the frame A. This bar $t$ is provided on its under side with inclined downward projections $v$ and is connected by a rod $v'$ to the upper end of a lever $w$, which is pivoted intermediate its ends to the frame A and has its lower end bearing on a rotary cam I, which imparts an oscillatory motion to said lever and a corresponding intermittingly-reciprocating motion to the bar $t$. In this movement of said bar the downward projections $v\ v$ thereof are carried onto and from the tops of the supporting-rollers $u\ u$, and consequently the arms $r\ r$ receive a rocking motion which is transmitted to the shafts $p\ p$. To each of these shafts is fastened a pair of the sheet-shifting arms L, preferably by means of brackets J, each of which is formed with two eyes 1 2, disposed at right angles to each other and split from said eyes outward and formed with perforated ears 3 3 for the reception of bolts by which to clamp the eyes 1 and 2 on the shaft $p$ and arm L, passing, respectively, through said eyes, as more clearly shown in Figs. 15 and 17 of the drawings. Said construction of the bracket J allows the arm L to be shifted both laterally and longitudinally, as may be required, to place said arm in its proper position to shift the folded sheets into the successive sets of paper-folding forks.

To allow the arms L L to obtain the requisite hold upon the folded sheets to push them out of one set of forks and into the succeeding set, we attach to the free end of each of said arms a plate 4, formed on a sleeve 5, through which passes the free end of the arm L, as clearly shown in Figs. 15, 16, and 18 of the drawings. Said sleeve is adapted to be shifted lengthwise on the said arm and is thus adjustable in said direction. A set-screw 6, passing through the sleeve and engaging the arm, serves to retain the plate 4 in its adjusted position.

Under the free end of the arm L is a finger 7, which projects from the plate 4 and is preferably connected thereto by the rear end of the finger passing through a vertical slot 8 in the plate and screw-threaded and fastened by a nut 9 applied thereto. The vertical slot 8 allows the finger 7 to be set a greater or less distance from the bottom of the plate 4 to allow said finger to press upon the top of the folded sheets while the plate engages the rear edge of said sheets. To insure said pressure of the finger 7, we employ a suitable spring S, which may be coiled around the shaft $p$ and secured at one end either to the carriage C or to the journal-box $m$ and made to bear with its opposite end upon the top of the arm L. Said pressure of the finger upon the sheets we deem essential, owing to the fact that the folded sheets are liable to be bulky and on that account difficult to be moved by the plate 4, engaging the rear edge of the folded sheets. To further reinforce the hold upon the sheets, we attach to the under side of the finger 7 suitable biting devices, which may consist either of a small pin 10, projecting from the bottom of the finger, as shown in Fig. 18 of the drawings, or of soft-rubber strips 11 or other suitable friction-pad secured to the under side of the finger, as represented in Fig. 15 of the drawings.

In the operation of the described paper-folding forks and sheet-shifting arms L L L the yokes which carry said forks are rocked on their pivots and caused to swing back and forth in semicircles, and thus present the free ends of the forks alternately toward opposite ends of the machine. Said yokes operate synchronously, and their movements are so timed as to leave them at rest in their horizontal positions a sufficient period to allow the paper, with its wrapper, to be inserted into the forks $a$ $a$ while said forks are presented toward the rear end of the machine, and subsequently allow the said paper and wrapper to be pushed out of said forks while presented toward the forward end of the machine. In the turning of the yokes to carry the forks from the first to the second mentioned positions the portions of the sheets carried in said forks, as represented in Figs. 12 and 13 of the drawings, are folded over onto the top of the portions of the sheets lying upon the guides 1 1. Said folding being effected at each yoke or set of yokes causes the paper to be completely enveloped in the wrapper. As soon as the folded sheets have been pushed out of the forks the yokes turn on their pivots and reverse the position of the forks in time to receive another set of sheets.

The actuating mechanisms of the sheet-shifting arms L L L are timed to lift said arms while the aforesaid yokes turn on their pivots, and as soon as the forks $a$ $a$ present their free ends forward said arms are caused to descend and carry the plates 4 down immediately back of the folded sheets and press with the fingers 7 firmly upon the tops of said sheets, and then the carriage C advances and causes the engaged free ends of the arms L L L to push the folded sheets out of the forks. The instant this is effected the yokes again turn on their pivots to reverse the position of the forks in time to permit the advancing-arms L L L to push the folded sheets into the forks in front of the sheets. The paper, with its wrapper, is introduced into the first set of forks $a$ $a$ by means of a propelling-roller 12 and drop-roller 13 over said propelling-roller. The paper delivered at said rollers has the rear margin of the wrapper protruding sufficiently to form a flap for receiving paste by which to secure the wrapper around the folded paper. To apply said paste automatically, we employ a suitable pasting instrument N, preferably immediately back of the propelling-roller 12. The aforesaid flap or protruding margin of the delivered wrapper is supported by a plate 14, extending across the machine and secured to suitable stationary supports on the frame A.

14$^a$ denotes guide-fingers extending from the plate 14 and placed flush with the top thereof.

The pasting instrument proper consists of a paste-blade 15, carried on the lower ends of rods 16, which are fastened to a shaft 17, mounted in eyes on the free ends of rock-arms 18, projecting from a rock-shaft 19.

20 denotes the paste-roller, which is preferably hexagonal or other suitable polygonal shape in cross-section, journaled at its ends in bearings on the top of the paste-trough 21, which is provided with a suitable scraper 22 for removing surplus paste from the face of the roller.

To carry the paste-blade 15 to and from the paste-roller 20 and wrapper-supporting plate 14, a rod 23 is fastened to the end of the shaft 17 and extends therefrom in opposite direction from the rods 16 and passes with its free end through an eye in the hub 25, pivoted to a post 24, erected on the frame A.

In the operation of the rock-arms 18 they carry the shaft 17 up and down in an arc of ninety degrees, and during said movement the rod 23 slides longitudinally in the hub 25 and turns the same on its pivot. This causes the rod 23 to turn correspondingly on said pivot, and by the rigid attachment of said rod to the shaft 17 said shaft is caused to turn and swing the supporting-rods 16 of the paste-blade 15 in an arc of ninety degrees. The upward movement of the rock-arms 18 lifts the paste-blade 15 from the wrapper-supporting plate 14 by means of the rods 16, and at the same time the rod 23, sliding in the pivoted hub 25, turns the shaft 17 and causes the rods 16 to be carried from a vertical to a horizontal position and toward the paste-roller sufficiently to bring the paste-blade 15 in contact with the paste-roller 20, and thus applies the paste to the blade. In the downward movement of the rock-arms 18 the aforesaid action is reversed and the paste-blade carried down to apply the paste to the protruding rear margin of the wrapper resting upon the plate 14. To one end of the paste-roller 20 is fastened a ratchet-wheel 26, and to the axis of said roller is pivoted an arm 27, to which is pivoted a pawl 28. The free end of the arm 27 is connected by a rod 29 to the free end of an arm 30, fastened to the pivoted hub 25, so that the turning of said hub produced by oscillation of the rock-arms 18 causes the arm 30 to impart a rocking motion to the arm 27, which partially turns the paste-roller 20 by the engagement of the pawl 28 with the ratchet-wheel 26 during the movement of the arm 27 in one direction. By these means the paste-roller 20 is caused to present a different face thereof toward each approach of the paste-blade. The rock-arms 18 are actuated by means of an arm 31, attached to the shaft 19 and connected at its free end by a rod 32 to one end of a lever 33, which is pivoted intermediate its ends to the frame A, as shown at 33ª, and has on its long arm a pivoted roller 34, by which it bears on a rotary cam 35. To the end of the short arm of the lever 33 is connected a rod 36, which passes through an ear 37, attached to the frame A. Between said ear and the attached end of the rod 36 is a collar 38, adjustably secured to said rod, and between this collar and the ear 37 is a spiral spring 39, surrounding the rod and exerting expansive force on the collar, and thereby forces the lever in opposition to the cam 35. Said cam and spring are arranged in such relative positions as to cause the cam to lift the pasting instrument from the wrapper to the paste-roller and the spring to carry said instrument back and down to the wrapper resting on its supporting-plate 14. This spring action of the lever 33 is specially desired for the operation of a guard for preventing the paste-blade 15 from coming in contact with the supporting-plate 14 in case the wrapper accidentally fails to be delivered under the pasting instrument. This guard constitutes one of the salient features of our invention. The essential features of said guard are its being movably supported and normally in position to arrest the action of the pasting instrument and thrown from said position by the sheets or wrapper delivered under said instrument. Our preferred construction of said guard is as follows, to wit: At a suitable distance beneath the wrapper-supporting plate 14 is a transverse shaft 40, pivoted to the frame A. To this shaft, at or near the center of its length, is rigidly attached the guard-finger 41, the upper end of which plays through a transverse slot in the plate 14 and normally projects slightly above said plate. To the end of the shaft 40 is fastened an arm 42, which extends downward therefrom and is nearly or quite in a perpendicular position when the guard-finger 41 is in its normal position, in which position it is sustained, preferably, by means of an arm 43, fastened to either the shaft 40 or arm 42 and adjustably weighted to hold the arm 42 in contact with a stop 44, attached to the frame A. Under the arm 42 is a detent 45, consisting, preferably, of a vertically-movable bar sustained nearly or quite vertical and sliding in guides secured to the frame A. Said detent is connected to the long arm of the lever 33, preferably by means of a strap or link 46, which causes the detent to be moved up and down by said lever.

The operation of the described guard is as follows: In case the wrapper fails to be delivered upon its supporting-plate 14 the guard-finger 41 is allowed to project at the top of said plate, and thus the guard-finger remains undisturbed in its normal position, and when in this position the arm 42 is sustained with its lower end directly over the upper end of the detent 45, which is thereby caused to collide with the arm 42 during the upward movement of the long arm of the lever 33 and arrests said movement in time to prevent the pasting-blade 15 being brought in contact with the supporting-plate 14, and thus said plate is kept clean and in proper condition to receive over it the next delivered wrapper without danger of smearing the under side of said wrapper.

The aforesaid automatic stop of the pasting instrument is permitted by the employment of the spring 39 for actuating the lever 38 to carry the pasting instrument to the wrapper-supporting plate 14, said spring permitting its expansion to be checked without danger of being broken or unduly straining the lever and its connections.

When the wrapper is properly delivered upon its supporting-plate 14, the front edge of the wrapper in passing to said position encounters the projecting free end of the guard-finger 41 and pushes the same forward and out of the way, and thereby turns the shaft 40 sufficiently to carry the arm 42 out of the path of the detent 45, which thus permits free movement of the lever 33 to carry the pasting instrument to the wrapper delivered upon the supporting-plate 14.

45ª represents a gaging-screw which is adjustably connected to an ear on a suitable stationary support and disposed over an arm 46ª, projecting from the heel on one of the arms 18. Said gaging-screw is adjusted to regulate the degree of contact of the pasting-blade with the wrapper.

The pasting of the wrapper is effected after the paper, with its wrapper, has been introduced into the first set of folding-forks a by the roller 12 with the drop-rollers 13, and said drop-rollers are timed in their action to rise from the underlying sheets during the pasting operation and during the subsequent draft of the sheets across the roller 12 by the shifting of said sheets from the first set to the second set of folding-forks a a. Said lifting of the drop-rollers prevents their coming in contact with the paste on the flap of the wrapper.

In the subsequent repeated folding of the paper with its pasted wrapper by the successive sets of folding-forks a a the pasted margin or flap of the wrapper becomes finally fastened to the adjacent portion of the wrapper, and in order to insure the adhering of the flap we place beyond the last set of folding-forks a set of compression-rollers 47 and 48, between which the wrapped paper passes and is thereby compressed, and the pasted flap is pressed more effectually onto the wrapper. Beyond and in proximity to these compressing-rollers are tape-rollers 49 and 50, placed one over the other, and from each of these tape-rollers extends a set of tapes 51 52, which are prolonged a sufficient distance to allow the paste of the wrapper to become dry before the wrapped paper is delivered from between said sets of tapes. The two sets of tapes pass around rollers 53 and 54, which carry the upper set contiguous to the lower set of tapes, so as to insure their moving the wrapped paper carried between them. Each of said sets of tapes passes across idlers 55 and across intermediate tightening-rollers 56. Under the delivery ends of the tapes 51 and 52 may be placed a mail-bag R, suspended from a suitable supporting-frame or holder T and in proper position to receive the wrapped paper from said tapes.

The compressing-rollers 47 and 48 are geared to receive rotary motion and propel the wrapped paper to the tape-rollers 49 and 50, which are likewise geared, preferably, through the medium of a rotary gear-wheel 57, meshing with the gears on the lower rollers 47 and 50.

P' represents an ordinary paper-folding machine, in which 58 and 59 designate the usual folding-rollers, and 60 the blade which tucks the paper into the bite of said rollers. By means of tapes 61 the paper is carried from said folding-rollers part way to the hereinbefore-described sets of paper-folding forks *a a*. Beneath the tapes 61 and leading to the delivery ends thereof is a set of tapes 62, to which the wrappers may be fed either by hand or by automatically-operating mechanism.

When the wrapper is fed into the machine by hand, the usual gage 94 is to be employed. Said gage is fastened to a transverse shaft, to the end of which is attached an arm, which is depressed by a horn 95 on one of the descending rock-arms 96, which carry the roller-shaft, as represented in Fig. 3 of the drawings. We prefer, however, to feed the wrappers from a web W, having the addresses printed thereon and wound on a roll O, which is pivotally supported, as represented in Fig. 3 of the drawings. The free end of said web passes between combined feed and cutting rollers P P, which are geared to impart positive rotary motion to them. One of said rollers is provided with a longitudinal groove 63, and the other roller has projecting from its surface a longitudinal cutting-blade 64, which enters the groove 63 and partially severs the successive wrappers from the web. The rollers P P propel the partially-severed wrapper to the tape-roller 65, which carries the tapes 62 and is geared to rotate at a greater speed than the rollers P P, so that said tape-roller, with the aid of the drop-roller 66, disrupts the individual wrapper from the web. The action of the folding-machine P' and speed of the wrapper-conveying tapes 62 are timed to deliver the paper upon the top of the wrapper, and said wrapper is of a sufficient length to cause its rear margin to protrude from under the paper and allow the paste to be subsequently applied to said margin, as hereinbefore described. The tapes 61 and 62 deliver the paper and wrapper upon the top of a propelling-roller 67, over which are drop-rollers 68. Immediately in front of the drop-roller shaft is the drop-gage 69 for assembling the paper and wrapper. A short distance beyond the propelling-roller 67 is another geared roller 70, onto the top of which the assembled paper and wrapper are delivered by the roller 67. Over the rollers 70 are rollers 71, which press the assembled sheets into frictional contact with the subjacent roller 70, which passes said sheets onto conveying-tapes 72, by means of which they are carried to the hereinbefore-described roller 12, which is adjacent to the first set of paper-folding forks and passes the assembled sheets into said forks.

In the operation of a mailing-machine it is very desirable to guard against the mixing of accidental incompletely-wrapped papers with properly-wrapped papers in the mail-bag placed at the delivery end of the machine to receive the wrapped papers directly therefrom. To accomplish this desired object, we employ between the paper and wrapper assembling gage 69 and the guarded pasting instrument N a switch 73, which is normally in position to conduct the assembled sheets from the two sets of delivering-tapes 61 and 62 to the aforesaid pasting instrument and movable to divert said sheets from said direction, and means for controlling said switch by the sheets in transit on the aforesaid two sets of delivering-tapes. Said switch and means for controlling the same resemble to some extent the devices shown in the Letters Patent No. 618,848, granted to Talbot C. Dexter January 31, 1899. The switch consists of fingers projecting at right angles from a transverse rock-shaft 74 and normally horizontal toward the sheet-propelling roller 67. The mechanism for operating said switch consists of a rotary cam-disk 75, which is provided with a notch 76 in its periphery. A pitman 77 is connected at one end to the short arm of a bell-crank lever 78, pivoted to the frame A. The opposite end of said pitman has pivoted to it a roller 79, which is held in contact with the periphery of the cam-disk 75 by means of a spring 80, surrounding a rod 81, which is secured at one end to the frame A, as shown at 82, and has its free end extending toward the cam-disk 75 and passing through an ear 83, projecting from the pitman. A collar 84 is secured to the rod 81 near its point of attachment 82, and between this collar and aforesaid ear 83 the spring 80 exerts expansive force. The aforesaid short arm of the bell-crank lever 78 is connected by a strap or link 85 to an arm 86, fastened to the end of the rock-shaft 74.

The mechanism for controlling the actuating mechanism of the switch is as follows: Transversely over each of the two sets of tapes 61 and 62 is a bar 87, to which is pivoted a finger 88, which lies with its free end toward the delivery ends of the tapes and in the path of the sheet carried on said tapes. From the pivoted end of said finger projects upward a detent 89, as shown more clearly in Fig. 9 of the drawings. To a bracket 90 on each of the bars 87 is pivoted a transverse shaft 87ª, to which is fastened a lever 91, the free end of which is directly over the top of the detent 89 when the finger 88 lies in its normal position in the path of the sheets. To the end of each of the shafts is fastened an arm 91ª, which is connected to a strap 92, which in turn is connected by a rod 93 to the long arm of the bell-crank lever 78, hereinbefore mentioned.

The operation of the described mechanism for operating and controlling the switch is as follows: The cam-disk 75 has a continuous rotary motion and is timed to bring the notch 76 in position to allow the roller 79 of the pitman 77 to enter it, and thereby cause said pitman to throw the switch into its normal horizontal position in time to allow the assembled paper and wrapper to pass over said switch and to the propelling-roller 70, which, with the assistance of the tapes 72, carries said sheets forward to the pasting instrument N. This operation is permitted by the sheets in transit on the tapes 61 and 62 passing under the fingers 88 and tilting the same to throw the detents 89 from under the levers 91, which are thereby free to be rocked by the action of the pitman 77. If, however, either the paper or the wrapper, or both, fail to be carried to the assembling-gage 69, the finger 88 over the vacant tapes drops with its free end beneath the plane of the tapes, and thereby throws the detent into a position to arrest the action of the lever 91, and this prevents the spring 80 from pushing the pitman 77 to a position to allow of the roller 79 entering into the cam-notch 76. Hence the switch remains in its tilted position, as shown in Fig. 9 of the drawings, which illustrates the aforesaid action in case the wrapper is missing from its conveying-tapes 62. The paper represented at Q passes on without the cover to the tilted switch 73, which throws said paper down and out of the path leading toward the pasting and folding devices.

What we claim as our invention is—

1. A paper-folder comprising a prolonged horizontal bed, a plurality of paper-folding devices distributed lengthwise over said bed and supported oscillatory to lie alternately in opposite directions upon said bed, mechanisms actuating said folding devices, and mechanisms shifting the folded paper from one of said devices onto the bed and thence into the succeeding folding device as set forth.

2. A paper-folder comprising a paper-supporting bed, a plurality of paper-folding forks disposed in a row over said bed and supported oscillatory toward opposite ends of said bed and at the same time lie in planes parallel and contiguous to the bed, mechanisms actuating said forks, and means traveling longitudinally over said bed and shifting the paper to the successive forks as set forth.

3. A paper-folder comprising a paper-supporting bed, a plurality of paper-folding forks disposed in a row over said bed and pivoted at the free ends of the forks in bearings disposed contiguous to the plane of the aforesaid bed, mechanisms rocking said forks into reversed positions, and means traveling longitudinally over said bed and shifting the paper to the successive forks and at the same time pressing upon the folded portion of the paper across the entire width thereof as and for the purpose set forth.

4. The combination of a paper-supporting bed, a plurality of paper-folding forks disposed in a row over said bed and pivoted to swing into reversed positions, mechanism imparting intermittent synchronous action to said forks, means reciprocating longitudinally over the aforesaid bed and movable vertically to and from the same to shift the paper to the successive forks, and mechanisms actuating said means and timed to lift the same from the bed during the reversing action of the aforesaid forks as set forth.

5. A mailing-machine comprising a plurality of sets of paper-folding forks disposed in a straight row, each of said sets supported oscillatory on an axis at the free ends of the forks, guides supporting the paper between the sets of forks, and means for shifting the folded paper into the successive sets of forks.

6. In a mailing-machine the combination of a paper-supporting bed, a plurality of paper-folding forks disposed in a row over said bed and pivotally supported at the receiving ends of the forks and in stationary bearings located in proximity to the plane of the aforesaid bed, means for imparting oscillatory motion to the forks, and means reciprocating over the bed and shifting the paper to the successive forks.

7. In a mailing-machine the combination of a paper-supporting bed secured stationary in its position, a plurality of paper-folding forks disposed in a row over said bed and pivotally supported at the receiving ends of the forks and in stationary bearings located in proximity to the plane of the bed, means for synchronously rocking the row of forks, and means reciprocating over the bed and shifting the paper to the successive forks as set forth.

8. A mailing-machine comprising a plurality of sets of paper-folding forks disposed in a row, each of said sets supported oscillatory on an axis at the free ends of the forks, means for turning the forks on said axis, paper-supporting guides between the sets of forks, means for introducing the paper into the first set of forks, means for shifting the folded paper into the successive sets of forks, and means for compressing the folded paper beyond the row of folding-forks.

9. A mailing-machine comprising a plurality of sets of paper-folding forks disposed in a row and each of said sets supported oscillatory at the free ends of the forks, stationary paper-supporting guides between the sets of forks, feeding devices supplying the paper and wrapper to the first set of forks, means for shifting the folded paper and wrapper into the successive sets of forks and paper-compressing rollers beyond the row of forks.

10. A mailing-machine comprising a stationary paper-supporting bed, a plurality of paper-folding forks disposed in a row over said bed and supported reversibly to present the receiving ends of the forks alternately toward opposite ends of the bed, mechanisms imparting the reversing action to the forks, feeding devices supplying the sheets of paper and wrapper simultaneously, a gage assembling said sheets, conveyers delivering the assembled paper and wrapper from said gage to the folding-forks, and means for shifting said sheets to the successive forks as set forth.

11. The combination of paper-folding rollers, a blade introducing the paper into the bite of said rollers, a prolonged bed disposed to receive the paper from said folding-rollers, and a plurality of paper-folding devices distributed over said bed and imparting successive folds to the paper during its transit over said bed.

12. The combination of a prolonged bed, wrapper-conveyers extending toward said bed, paper-folding rollers, a blade introducing the paper into the bite of said rollers, paper-conveyers extending from said rollers and delivering the folded paper upon the wrapper, a gage assembling said wrapper and paper, conveyers delivering the assembled sheets to the aforesaid bed, and a plurality of paper-folding devices distributed over said bed and imparting successive folds to the assembled sheets during their transit over the bed.

13. The combination of a plurality of sets of paper-folding forks disposed in a row and each set supported oscillatory to present the free ends of the forks alternately in opposite directions, paper-supporting guides between the sets of forks, means for introducing the sheets into the first set of forks, arms supported movable longitudinally over the row of forks and oscillatory to and from the same and means attached to the free ends of said arms to shift the folded sheets into the successive sets of forks as set forth.

14. The combination of a plurality of sets of paper-folding forks disposed in a row and each set supported oscillatory to present the free ends of the forks alternately in opposite directions, paper-supporting guides between the sets of forks, means for introducing the sheets into the first set of forks, arms supported movable longitudinally over the row of forks and oscillatory to and from the same, means attached to the free ends of the arms to shift the folded sheets into and out of the successive forks, and rollers compressing the folded sheets beyond the row of forks.

15. The combination of a plurality of sets of paper-folding forks disposed in a row and each set supported reversibly to present the free ends of the forks alternately in opposite directions, mechanisms imparting the reversing action to the sets of forks, paper-supporting guides between the sets of forks, feeding devices supplying the sheets of paper and wrapper to the machine, a gage assembling the sheets, propelling devices carrying the assembled sheets into the first set of forks, arms supported movable longitudinally over the row of forks and oscillatory to and from the same and means attached to the free ends of said arms for shifting the folded sheets into the successive sets of forks as set forth.

16. The combination of a plurality of sets of paper-folding forks disposed in a row and each set supported reversibly to present the free ends of the forks alternately in opposite directions, mechanism imparting the reversing action to the sets of forks, arms carried forward and back longitudinally over the row of forks and oscillatory to and from the same, means carried on said arms for shifting the folded paper forward into the successive sets of forks, and means for lifting said arms in their retrograding movement as set forth.

17. The combination of a plurality of sets of paper-folding forks disposed in a row and each set reversible to present the free ends of the forks alternately in opposite directions, mechanism reversing the sets of forks, feeding devices supplying the sheets of paper and wrapper to the machine, a gage assembling said sheets, propelling devices carrying the assembled sheets into the first set of forks, arms carried forward and back longitudinally over the row of forks and oscillatory to and from the same, means carried on said arms for shifting the folded sheets forward into the successive sets of forks and means for lifting the arms during their retrograding movements.

18. A mailing-machine comprising a plurality of sets of sheet-folding forks disposed in a row and each set supported oscillatory on a transverse axis located at the free ends of the forks, mechanisms imparting oscillatory motion to the sets of forks, means for introducing the sheets of paper and wrapper into the first set of forks, means for applying paste to the protruding portion of the wrapper, and means for shifting the folded sheets into the successive sets of forks.

19. A mailing-machine comprising a plurality of sets of sheet-folding forks disposed in a row and each set supported oscillatory on a transverse axis located at the free ends of the forks, mechanisms imparting oscillatory motion to the sets of forks, paper-supporting guides between the sets of forks, means for introducing the sheets of paper and wrapper into the first set of forks, means for applying paste to the protruding margin of the wrapper, and means for shifting the folded sheets into the successive sets of forks as set forth.

20. The combination of a yoke consisting of parallel arms united at one end by a transverse bar and pivoted at their free ends, and forks projecting from said bar between the aforesaid arms, means for inserting into said forks the articles to be folded, and mechanism imparting oscillatory motion to said yoke and thereby folding the inserted article.

21. The combination of a plurality of yokes disposed transversely in a row and each consisting of parallel arms united at one end by a transverse bar and pivoted at their free ends and forks extending from said bar between the aforesaid arms, means for inserting the articles to be folded into the forks of the first yoke, mechanism imparting oscillatory motion to the yokes, and means for shifting the articles successively from yoke to yoke.

22. The combination of a plurality of yokes, each consisting of parallel arms united at one end by a transverse bar and pivoted at their free ends, and forks projecting from the transverse bar between the aforesaid arms, pinions attached to the yokes concentric with the pivots thereof, intermittingly-reciprocating racks meshing with said pinions, means for introducing the articles to be folded into the forks of the first yoke, and means for shifting folded articles into the forks of the successive yokes as set forth.

23. The combination of a plurality of sets of paper-folding forks disposed in a row, mechanisms imparting oscillatory motion to said sets of forks, a carriage reciprocating longitudinally over said row, arms pivotally supported on said carriage and provided on their free ends with means for shifting the folded sheets into the successive forks and means for lifting said arms during the rearward movement of the carriage.

24. The combination of a plurality of sets of paper-folding forks disposed in a row, and each set pivoted to present the free ends of the forks alternately in opposite directions, pinions fastened to the sets of forks concentric with the pivots thereof, reciprocating racks meshing with said pinions, a carriage reciprocating longitudinally over the row of forks, arms pivotally supported on said carriage, means for introducing the sheets into the first set of forks, and means attached to the free ends of the aforesaid arms for shifting the folded sheets into the successive sets of forks as set forth.

25. The combination of a plurality of sets of paper-folding forks disposed in a row and each set pivoted at the free ends of the forks, pinions attached to the sets of forks concentric with the pivots thereof, reciprocating racks meshing with said pinions, a carriage reciprocating longitudinally over the row of forks, arms pivotally supported on said carriage, means for introducing the paper and wrapper into the first set of forks, means for applying paste to the protruding margin of the wrapper, means attached to the free ends of the aforesaid arms for shifting the folded sheets into the successive sets of forks, and means for lifting said arms during the rearward movement of the carriage as set forth.

26. The combination of successive sets of oscillatory paper-folding forks disposed in a row, a carriage reciprocating longitudinally over said row, shafts mounted transversely on said carriage, brackets connected to said shafts adjustable lengthwise thereof, arms connected to said brackets, means for introducing the paper and wrapper into the first set of forks, and means on the free ends of the aforesaid arms for shifting the folded sheets into the successive sets of forks.

27. The combination of successive sets of oscillatory paper-folding forks disposed in a row, a carriage reciprocating longitudinally over said row, shafts mounted transversely on said carriage, brackets connected to said shafts adjustable lengthwise thereof, arms connected to said brackets, means for introducing the paper and wrapper into the first set of forks, means for applying paste to the protruding margin of the wrapper, fingers on the free ends of the aforesaid arms for pressing upon the folded sheets and shifting the same into the successive sets of forks, and means for lifting said arms during the rearward movement of the carriage as set forth.

28. The combination of successive sets of oscillatory paper-folding forks disposed in a row, a carriage reciprocating longitudinally over said row, shafts mounted transversely on said carriage, rock-arms fastened to said shafts, rollers pivoted to said rock-arms, an intermittingly-reciprocating bar under said rollers, means for lifting said bar during its movement in one direction, arms firmly secured to the aforesaid shafts and means on the free ends of said arms for shifting the folded sheets into the successive sets of forks as set forth.

29. The combination of successive sets of oscillatory paper-folding forks disposed in a row, a carriage reciprocating longitudinally over said row, shafts mounted transversely on said carriage, rock-arms fastened to said shafts, carrying-rollers beneath the rock-arms, a bar sliding on said carrying-rollers and supported thereby parallel with the carriage and provided on its bottom with inclined downward projections to lift said bar, rollers pivoted to the aforesaid rock-arms and riding on said bar, means for intermittingly reciprocating said bar, and arms fastened to the transverse shafts and provided on their free ends with means for shifting the folded sheets into the successive sets of forks as set forth.

30. In combination with the successive sets of paper-folding forks and arms reciprocating longitudinally over said forks to shift the folded sheets into the successive sets of forks, plates attached to the free ends of said arms to engage the edge of the folded sheets, and fingers projecting from said plates to bear on the top of the folded sheets and adjustable vertically for varying thickness of the said sheets.

31. In combination with the successive sets of paper-folding forks and arms reciprocating longitudinally over said forks to shift the folded sheets into the successive sets of paper-folding forks, plates attached vertically to the free ends of said arms, sheet-depressing fingers projecting from said plates, and biting devices on the under sides of said fingers to reinforce their hold upon the sheets for shifting the same into the successive sets of forks as set forth.

32. In combination with the successive sets of paper-folding forks and arms for shifting the folded sheets into said forks, vertical plates on said arms to engage the edges of the folded sheets, sheet-depressing fingers projecting from said plates, and friction-pads on the under sides of said fingers as set forth.

33. The combination of longitudinal guide-bars, successive sets of paper-folding forks over said bars and pivoted to present the free ends of the forks alternately toward opposite ends of said bars, mechanism imparting the reversing action to said forks, a feed-roller extending across the rear ends of said bars, drop-rollers over said feed-roller, means for shifting the folded sheets into the successive sets of forks, sheet-compressing rollers extending across the front ends of the aforesaid guide-bars, and conveying-tapes disposed to receive the sheets from the compressing-rollers as set forth.

34. A mailing-machine comprising longitudinal guide-bars, successive sets of paper-folding forks over said guide-bars and pivoted to present the free ends of the forks alternately toward opposite ends of said guide-bars, mechanisms imparting the reversing action to said forks, a feed-roller extending across the rear ends of the guide-bars, drop-rollers over said feed-roller, means for shifting the folded sheets into the successive sets of forks, sheet-compressing rollers extending across the front ends of the guide-bars, conveying-tapes disposed to receive the sheets from said compressing-rollers, and a receptacle disposed to receive the folded sheets from the delivery ends of the aforesaid tapes as set forth.

35. The combination with mechanisms for folding paper with an inclosing wrapper, of a feed-roller advancing the sheets to said mechanisms, separate feeding devices supplying respectively the paper and wrapper, a gage assembling the supplied sheets, conveyers carrying the assembled sheets to the aforesaid feed-roller, and a paste-applying instrument extending across the machine in proximity to said feed-roller.

36. The combination with mechanisms for folding paper with an inclosing wrapper, of a feed-roller advancing the sheets to said mechanisms, a paste-applying instrument extending across the machine in proximity to said roller and actuated periodically to apply the paste to the protruding margin of the wrapper, drop-rollers over said feed-roller, and mechanism lifting said drop-rollers during the period of the passage of the pasted portion of the wrapper across the feed-roller as set forth.

37. The combination with mechanisms for folding paper with an inclosing wrapper, of a feed-roller advancing the sheets to said mechanisms, separate feeding devices supplying respectively the paper and wrapper, a gage assembling said sheets, conveyers carrying the assembled sheets to the aforesaid feed-roller, a paste-applying instrument extending across the machine in proximity to said feed-roller and actuated periodically to apply the paste to the protruding margin of the wrapper, drop-rollers over the feed-rollers, and mechanism lifting said drop-rollers during the period of the passage of the pasted portion of the wrapper across the feed-roller as set forth.

38. In combination with mechanisms for folding paper with an inclosing wrapper, conveyers supplying the sheets, and a pasting instrument disposed to apply paste to the margin of the wrapper, a pivoted guard-finger sustained with its free end normally in the path of the sheets on the conveyers and actuated by the sheets in transit, a stop-arm actuated by said guard-finger, and a detent controlled by said stop-arm and arresting the action of the pasting instrument.

39. In combination with mechanism for folding paper with an inclosing wrapper and conveyers supplying said paper and wrapper, a pasting instrument disposed to receive under it the sheets from said conveyers, a pivoted guard-finger sustained with its free end normally in the path of the sheets on the conveyers and actuated by the sheets in transit, a stop-arm actuated by said guard-finger, a spring forcing the pasting instrument into position to apply the paste to the wrapper, and a detent controlled by said stop-arm and disposed to resist the action of the aforesaid spring when the guard-finger is in its normal position as set forth.

40. In combination with mechanisms for folding paper with an inclosing wrapper, and conveyers supplying said paper and wrapper, a pasting instrument disposed to receive under it the sheets supplied by the conveyers, a transverse shaft beneath the pasting instrument, a guard-finger attached to said shaft and sustained normally in the path of the sheets passing under the pasting instrument and tilted by the sheets in transit, an arm fastened to the aforesaid shaft, a lever transmitting motion to the pasting instrument, a spring actuating said lever to carry said instrument to a position to apply paste to the wrapper, and a detent connected to said lever and disposed to collide with the aforesaid arm held in position by the normally-disposed guard-finger, said collision of the detent arresting the movement imparted to the lever by the spring as set forth.

41. In combination with mechanisms for folding paper with an inclosing wrapper, and conveyers supplying said paper and wrapper, a pasting instrument disposed to receive under it the supplied sheets, a transverse shaft beneath the pasting instrument, a guard-finger attached to the central portion of said shaft, an arm attached to the end of said shaft, a stop limiting the motion of said arm and thereby sustaining the guard-finger in the path of the delivered sheets, means for yieldingly holding the aforesaid arm in contact with the stop, a lever transmitting motion to the pasting instrument, a spring actuating said lever to apply paste to the wrapper, and a detent connected to said lever and guided to collide with the aforesaid arm while in contact with the stop as set forth.

42. In combination with mechanisms for folding paper with an inclosing wrapper, a wrapper-feeder, tapes carrying the wrapper from the feeder part way toward the aforesaid folding mechanisms, paper-folding rollers, a blade introducing the paper between said rollers, tapes carrying the folded paper toward the delivery ends of the wrapper-conveying tapes, a gage assembling said wrapper and paper, a pasting instrument applying paste to the delivered wrapper, and means for carrying the said wrapper and paper to the aforesaid folding mechanisms.

43. In combination with mechanisms for folding paper with an inclosing wrapper, separate sets of tapes carrying respectively the wrapper and the paper part way toward said folding mechanisms, a gage assembling the delivered wrapper and paper, a switch normally in position to conduct the assembled sheets toward the aforesaid folding mechanisms and movable to divert the sheets from said direction, mechanisms actuating said switch, feelers actuated by the wrapper and paper in transit to the assembling-gage and controlling the action of the switch mechanism, a pasting instrument disposed to apply paste to the wrapper adjacent to the aforesaid folding mechanisms and a movable guard normally in position to arrest the action of the pasting instrument and thrown out of said position by the wrapper passing over it as set forth.

44. In combination with mechanisms for folding paper with an inclosing wrapper, separate sets of tapes conveying respectively the wrapper and paper part way toward said folding mechanisms, a gage assembling the delivered wrapper and paper, a switch normally in position to conduct the assembled sheets toward the aforesaid folding mechanisms and movable to divert the sheets from said direction, mechanisms actuating said switch, feelers actuated by the wrapper and paper in transit to the assembling-gage and controlling the action of the switch mechanisms, a transverse paper-supporting bar adjacent to the aforesaid folding mechanisms, conveyers delivering the assembled wrapper and paper over said supporting-bar, a pasting instrument movable to and from said bar, mechanisms actuating said pasting instrument, a movable guard normally projecting with its free end above the paper-supporting bar and actuated by the wrapper passing over it, and a detent connected to the actuating mechanism of the pasting instrument and controlled by the normally-disposed guard to arrest the action of the pasting instrument as set forth.

45. A mailing-machine consisting mainly of successive sets of paper-folding forks disposed in a row and each set reversible to present the free ends of the forks alternately in opposite direction, mechanism imparting the reversing action to said sets of forks, a carriage reciprocating longitudinally over said row of forks, arms pivotally supported on said carriage, means for moving the free ends of said arms to and from the sets of forks, means secured to said ends of the arms to shift the folded sheets into the successive sets of forks, separate sets of tapes conveying respectively the wrapper and paper part way toward the row of forks, a gage assembling the delivered wrapper and paper, a switch normally in position to conduct the assembled sheets toward said forks and movable to direct the sheets from said direction, mechanisms actuating said switch, feelers disposed to be actuated by the wrapper and paper in transit to the assembling-gage and controlling the switch mechanisms, a transverse paper-supporting bar adjacent to the first set of paper-folding forks, conveyers delivering the assembled sheets over said supporting-bar, a pasting instrument over said bar and movable to and from the same, mechanisms actuating said pasting instrument, a movable guard normally projecting with its free end above the aforesaid supporting-bar and actuated by the wrapper passing over it, a detent connected to the actuating mechanism of the pasting instrument and controlled by the normally-disposed guard, compressing-rollers disposed beyond the row of forks to receive the folded sheets and fasten the pasted wrapper, and prolonged conveyers extending from said compressing-rollers to permit the paste to dry before the final delivery of the wrapped paper from the machine as set forth.

46. In combination with the successive sets of paper-folding forks disposed in a row, a carriage reciprocating longitudinally over said row, journal-boxes secured transversely to said carriage and adjustable longitudinally thereon, shafts mounted in said boxes, and paper-shifting arms secured to said shafts.

47. In combination with the successive sets of paper-folding forks disposed in a row, a carriage reciprocating longitudinally over said row, journal-boxes secured transversely to said carriage and adjustable longitudinally thereon, shafts mounted in said boxes, arms fastened to said shafts, means for imparting rocking motion to said arms, and paper-shifting arms fastened to said shafts and provided on their free ends with means for shifting the folded sheets into the successive sets of forks as set forth.

48. In combination with the successive sets of paper-folding forks disposed in a row, a carriage reciprocating longitudinally over said row, journal-boxes secured transversely to said carriage and adjustable longitudinally thereon, shafts mounted in said boxes, means for imparting rocking motion to the shafts, paper-shifting arms secured to said shafts, and springs depressing the free ends of said arms to insure their holds upon the folded sheets for shifting the same into the successive sets of forks.

49. In combination with the successive sets of paper-folding forks disposed in a row, a carriage reciprocating longitudinally over said row and provided with longitudinal slots, tubular journal-boxes extending transversely through said slots and provided on one end with an abutting collar and screw-threaded externally on the opposite end, nuts on the screw-threaded ends of said journal-boxes to clamp the same on the carriage, shafts mounted in said boxes and having screw-threaded protruding ends, nuts on said ends, rock-arms fastened to said shafts, means for actuating said rock-arms, brackets adjustably secured to the shafts, and paper-shifting arms adjustably secured to said brackets as set forth.

50. A mailing-machine comprising separate sets of conveyers delivering respectively the paper and the wrapper to said machine, an instrument applying paste to the wrapper, mechanisms folding said sheets, a switch normally in position to conduct said sheets from the aforesaid conveyers to the pasting instrument and movable to divert said sheets from said direction, and means actuated by the sheets in transit on the aforesaid conveyers, for controlling said switch.

51. A mailing-machine comprising separate sets of conveyers delivering respectively the paper and the wrapper to said machine, an instrument applying paste to the wrapper, mechanisms folding said sheets with the wrapper, means for compressing the folded sheets, a switch normally in position to conduct the paper and wrapper from the aforesaid conveyers to the pasting instrument and movable to divert said sheets from said direction, and means for controlling said switch.

52. In a mailing-machine, the combination of mechanisms folding the paper with its wrapper, an instrument applying paste to the wrapper in advance of the folding mechanism, separate sets of tapes supplying respectively the paper and the wrapper, a gage assembling said sheets at the delivery ends of said tapes, conveyers carrying the assembled sheets to the pasting instrument, a switch interposed between said conveyers and assembling-gage and normally in position to conduct the assembled sheets to said conveyers, mechanism actuating said switch to divert the sheets from said direction, and means actuated by the sheets in transit to the assembling-gage and controlling the switch mechanism.

53. In a mailing-machine, the combination with mechanisms for folding the paper with the wrapper, an instrument applying paste to the wrapper, a guard normally in position to arrest the action of the pasting instrument and thrown from said position by the sheets delivered under said instrument, separate sets of tapes supplying respectively the paper and the wrapper, a switch normally in position to deliver said paper and wrapper to the pasting instrument, mechanism actuating said switch to divert the sheets from said direction, and means actuated by the sheets in transit on the separate sets of tapes and controlling the switch mechanism.

54. In a mailing-machine, the combination of mechanism for folding the paper with the wrapper, an instrument applying paste to the wrapper in advance of the folding mechanism, a guard normally in position to arrest the action of the pasting instrument and thrown from said position by the sheet delivered under the pasting instrument, separate sets of tapes supplying respectively the paper and the wrapper, a gage assembling said sheets at the delivery ends of the two sets of tapes, a switch normally in position to conduct the assembled sheets toward the pasting instrument, mechanism actuating said switch to divert the assembled sheets from said direction, means actuated by the sheets in transit on said separate sets of tapes and controlling the switch mechanism.

TALBOT C. DEXTER. [L. S.]
  IRVEN H. DEXTER. [L. S.]
Witnesses:
 V. E. MARSH,
 G. V. B. LEITCH.